US010029804B1

(12) United States Patent
Chamberlain et al.

(10) Patent No.: US 10,029,804 B1
(45) Date of Patent: Jul. 24, 2018

(54) ON-BOARD, COMPUTERIZED LANDING ZONE EVALUATION SYSTEM FOR AIRCRAFT

(71) Applicant: Near Earth Autonomy, Inc., Pittsburgh, PA (US)

(72) Inventors: Lyle Chamberlain, Pittsburgh, PA (US); Hugh Cover, Pittsburgh, PA (US); Benjamin Grocholsky, Pittsburgh, PA (US); Bradley Hamner, Pittsburgh, PA (US); Sebastian Scherer, Pittsburgh, PA (US); Sanjiv Singh, Pittsburgh, PA (US)

(73) Assignee: NEAR EARTH AUTONOMY, INC., Pittsburgh, PA (US)

( * ) Notice: Subject to any disclaimer, the term of this patent is extended or adjusted under 35 U.S.C. 154(b) by 0 days.

(21) Appl. No.: 15/152,944

(22) Filed: May 12, 2016

Related U.S. Application Data

(60) Provisional application No. 62/161,368, filed on May 14, 2015.

(51) Int. Cl.
*B64D 45/08* (2006.01)
*B64D 45/04* (2006.01)
(Continued)

(52) U.S. Cl.
CPC ............. *B64D 45/08* (2013.01); *B64D 47/08* (2013.01); *G01C 21/165* (2013.01); *G05D 1/101* (2013.01);
(Continued)

(58) Field of Classification Search
CPC ........ B64C 2201/127; B64C 2201/042; B64C 2201/146; B64C 2201/122; B64C 25/52;
(Continued)

(56) References Cited

U.S. PATENT DOCUMENTS 6,311,108 B1 * 10/2001 Ammar ................ F41G 7/2226
701/16
7,920,943 B2 * 4/2011 Campbell ............ G05D 1/0676
244/75.1
(Continued)

OTHER PUBLICATIONS

Chambers et al., "Robust Multi-Sensor Fusion for Micro Aerial Vehicle Navigation in GPS-Degraded/Denied Environments," In Proceedings of American Control Conference, Portland, OR, Jun. 2014 (8 pages).
(Continued)

*Primary Examiner* — Jelani A Smith
*Assistant Examiner* — Luis A Martinez Borrero
(74) *Attorney, Agent, or Firm* — K&L Gates LLP (57) ABSTRACT

A computerized, on-board flight system for an aircraft has a landing-zone evaluation system for evaluating a landing zone for the aircraft based on sensory data from numerous sensing systems, including lidar, radar, and/or various cameras, to identify potential, suitable landing sites in the landing zone. Based on data from these sensory systems, the landing-zone evaluation system geometrically and semantically evaluates the landing zone's terrain, as well as identifies moving and stationary objects in the landing zone to identify the suitable landing sites for the aircraft.

19 Claims, 5 Drawing Sheets

(51) Int. Cl.
*G05D 1/10* (2006.01)
*B64D 47/08* (2006.01)
*G01C 21/16* (2006.01)
*G06K 9/00* (2006.01)
*G06T 7/20* (2017.01)
*G06T 7/60* (2017.01)
*G06K 9/52* (2006.01)
*G06T 19/20* (2011.01)

(52) U.S. Cl.
CPC ..... *G06K 9/00335* (2013.01); *G06K 9/00624* (2013.01); *G06K 9/52* (2013.01); *G06T 7/20* (2013.01); *G06T 7/60* (2013.01); *G06T 19/20* (2013.01)

(58) Field of Classification Search
CPC .... B64C 27/20; G05D 1/0088; G05D 1/0055; G05D 1/0676; G05D 1/101; G05D 1/0016; G05D 1/0866; B64D 45/04; B64D 45/08; B64D 47/08; B64D 13/06; B64D 17/80
USPC ....................................... 701/2, 54
See application file for complete search history.

(56) References Cited

U.S. PATENT DOCUMENTS

| | | | |
|---|---|---|---|
| 7,976,310 | B2 | 7/2011 | Bachelder et al. |
| 8,019,490 | B2* | 9/2011 | Ferren .................. G05D 1/0676 701/3 |
| 8,374,737 | B2* | 2/2013 | Takacs .................. G05D 1/0676 244/189 |
| 8,600,589 | B2* | 12/2013 | Mendez-Rodriguez .............. G01S 17/89 701/16 |
| 8,903,572 | B1* | 12/2014 | Hagelin ................. B64D 45/00 244/100 R |
| 9,177,481 | B2* | 11/2015 | Wang ..................... B64C 19/00 |
| 9,478,141 | B2* | 10/2016 | Revell ............... G06K 9/00637 |
| 9,639,088 | B2* | 5/2017 | Wang ..................... G01C 21/005 |
| 9,740,200 | B2* | 8/2017 | Bethke .................. B64C 39/024 |
| 9,880,281 | B2* | 1/2018 | Gilliland ................. G01S 17/88 |
| 2004/0245378 | A1 | 12/2004 | Nonami et al. |
| 2008/0119970 | A1* | 5/2008 | Campbell ............ G05D 1/0676 701/8 |
| 2009/0138138 | A1* | 5/2009 | Ferren .................. G05D 1/0676 701/3 |
| 2010/0039294 | A1* | 2/2010 | Feyereisen ........... G06K 9/0063 340/972 |
| 2011/0285981 | A1* | 11/2011 | Justice .................. G01S 7/4813 356/4.01 |
| 2011/0301784 | A1 | 12/2011 | Oakley et al. |
| 2012/0261516 | A1* | 10/2012 | Gilliland ............... G01S 17/107 244/183 |
| 2012/0314032 | A1* | 12/2012 | Muensterer .......... G01C 23/005 348/46 |
| 2013/0282208 | A1* | 10/2013 | Mendez-Rodriguez .............. G01S 17/89 701/16 |
| 2013/0338858 | A1 | 12/2013 | Cherepinsky et al. |
| 2014/0081484 | A1 | 3/2014 | Covington et al. |
| 2015/0170526 | A1* | 6/2015 | Wang ..................... B64C 19/00 701/16 |
| 2015/0210388 | A1 | 7/2015 | Criado et al. |
| 2015/0323932 | A1 | 11/2015 | Paduano et al. |
| 2016/0027313 | A1 | 1/2016 | Loussides et al. |
| 2016/0306363 | A1* | 10/2016 | Wang ................... G01C 21/005 |
| 2016/0335901 | A1* | 11/2016 | Singh ......................... G06T 7/73 |
| 2017/0018058 | A1* | 1/2017 | Spinelli ................. G01S 17/023 |
| 2017/0192418 | A1* | 7/2017 | Bethke .................. B64C 39/024 |
| 2017/0193829 | A1* | 7/2017 | Bauer .................. G08G 5/0069 |
| 2018/0090017 | A1* | 3/2018 | Loussides .............. G08G 5/025 |
| 2018/0100925 | A1* | 4/2018 | Gilliland ................. G01S 17/88 |

OTHER PUBLICATIONS

Scherer et al., "First Results in Autonomous Landing and Obstacle Avoidance by a Full-Scale Helicopter," 2012 IEEE International Conference on Robotics and Automation RiverCentre, Saint Paul, Minnesota, USA, May 2012, p. 951-956 (6 pages).

Maturana et al., "3D Convolutional Neural Networks for Landing Zone Detection from LiDAR", IEEE International Conference on Robotics and Automation (ICRA), May 2015 (8 pages).

Desaraju et al., "Vision-based Landing Site Evaluation and Trajectory Generation Toward Rooftop Landing", Robotics: Science and Systems • A Robotics Conference, Jul. 2014 (9 pages).

Oosterhuis et al., "Evaluation of tracking algorithms to autonomously following dynamic targets at low altitude", Intelligent Systems Laboratory Amsterdam, 2013 (10 pages).

Scherer et al., "Autonomous landing at unprepared sites by a full-scale helicopter," Robotics and Autonomous Systems, Sep. 2012 (18 pages).

Choudhury et al., "Autonomous Emergency Landing of a Helicopter: Motion Planning with Hard Time-Constraints," AHS Forum 69, May 2013 (14 pages).

Nuske et al., "Autonomous Exploration and Motion Planning for an Unmanned Aerial Vehicle Navigating Rivers," Journal of Field Robotics, Feb. 2015 (22 pages).

* cited by examiner

ON-BOARD, COMPUTERIZED LANDING ZONE EVALUATION SYSTEM FOR AIRCRAFT

PRIORITY CLAIM

The present application claims priority to U.S. provisional application Ser. No. 62/161,368, filed May 14, 2015, which is incorporated herein by reference in its entirety.

STATEMENT REGARDING GOVERNMENT RIGHTS

This invention was made with government support under Contract No. N00014-12-C-0671, awarded by Department of the Navy. The government has certain rights in the invention.

BACKGROUND

Identifying an appropriate location to land an aircraft (a "landing site") in a general, larger "landing zone" can be challenging without human assistance, such as for autonomous aircraft. The landing site should be free of obstacles both in the air and on the ground that can interfere with the landing of the aircraft. The landing site should also provide a suitable landing surface. For example, it should be sufficiently flat, sufficiently solid, etc.

SUMMARY

In one general aspect, the present invention is directed to a computerized, on-board flight system for an aircraft, such as autonomous or piloted rotorcraft, that has a landing-zone evaluation system for evaluating a landing zone for the aircraft based on sensory data from numerous sensing systems of the aircraft, including lidar, radar, and/or various cameras, to identify potential, suitable landing sites in the landing zone. Based on data from these sensor systems, the landing-zone evaluation system can geometrically and semantically evaluate the landing zone's terrain, as well as identify moving and stationary objects in the landing zone, to identify the suitable landing sites for the aircraft. For autonomous aircraft, the flight plan can be updated based on the landing zone evaluation. For piloted aircraft, the flight crew could be alerted or guided to the landing zone.

FIGURES

Various embodiments of the present invention are described herein by way of example in connection with the following figures, wherein.

DESCRIPTION

In one general aspect, the present invention is directed to an on-board, computer-based, flight system, with a landing-zone evaluation system, that can be used by aircraft to identify and evaluate a landing zone for the aircraft. In the description below, the aircraft is assumed to be an autonomous rotorcraft, such as a helicopter, although it should be recognized that the present invention is not so limited and that aspects of the present invention can be applied to other types of autonomous aircrafts as well as to non-autonomous (i.e., piloted) aircraft. In non-autonomous aircraft that employ the landing-zone evaluation system, the landing-zone evaluation system can provide warnings or other alerts to the flight crew, and/or aid in guiding the pilot to the landing site. For autonomous aircraft, the landing-zone evaluation system can supply inputs to the craft's flight planning system, described below.

The term "landing site" is used herein to refer to a particular location in a larger, general "landing zone" where the rotorcraft is targeted to land. For example, the "landing zone" might be a general landing location, such as a field, that might include one or more possible landing sites, which are locations in the landing zone that are suitable for landing the rotorcraft.

Figure 1:
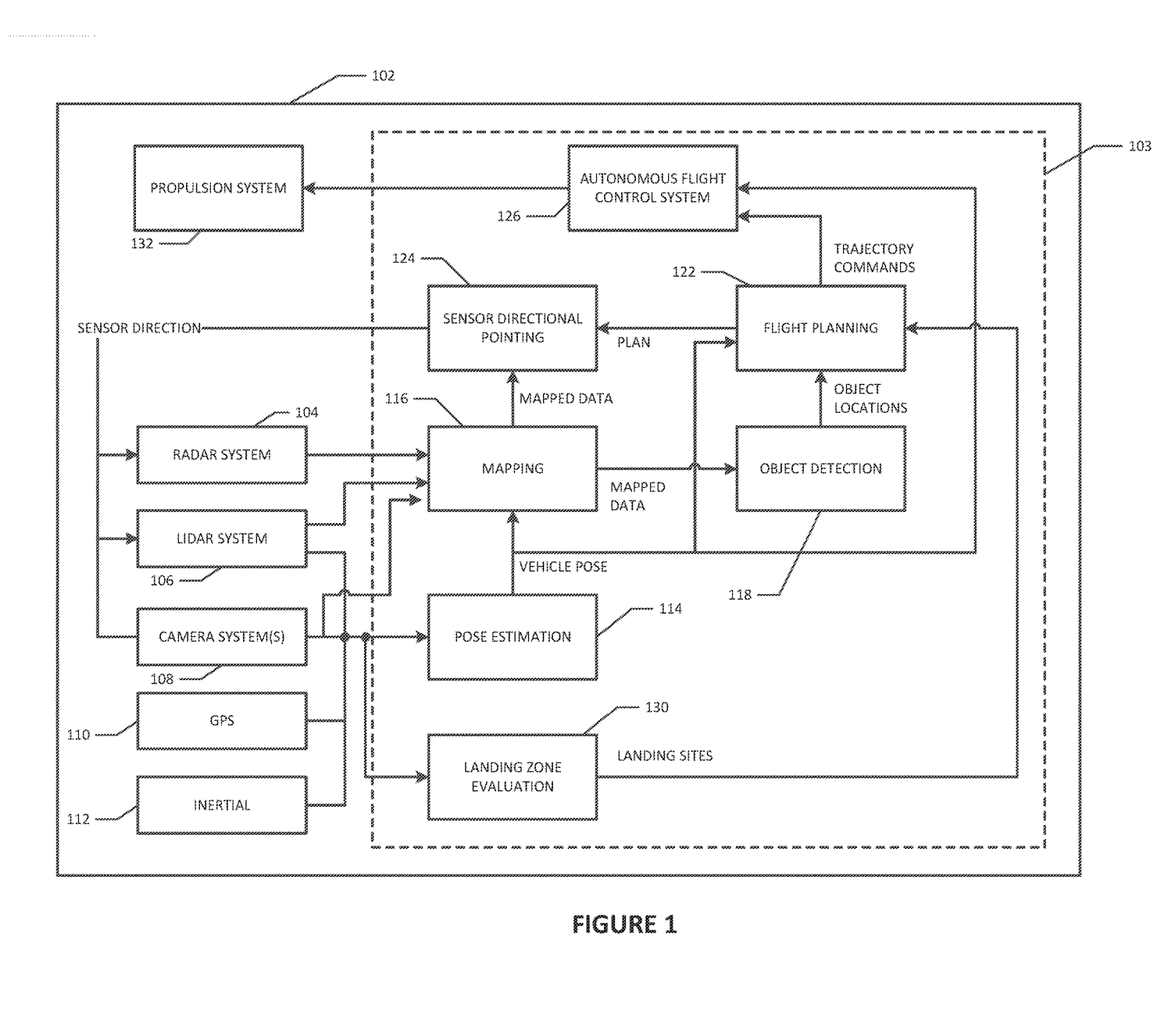
FIG. 1 is a block diagram of a computerized, on-board flight system for an aircraft according to various embodiments of the present invention.

Before describing how the landing zones are evaluated, a description of the navigation components of the rotorcraft is provided. FIG. 1 schematically depicts an example of an on-board, computerized flight system 102 that can be employed in connection with different kinds of rotorcraft for autonomous or semi-autonomous operation. As shown, the flight system 102 includes various components which provide data to an on-board computer system 103 of the craft regarding its current operating conditions and its surrounding environment. A radar system 104 transmits from the craft high-frequency electromagnetic waves which are reflected from various objects in the environment around the craft and received back by the radar system 104 to determine the range, angle and/or velocity of the detected objects. A lidar system 106 uses laser light or a focused beam of light to detect objects in the environment. In one embodiment, the lidar system 106 may comprise one or more channels that scan side-to-side in front of the aircraft. The pointing angle of the lidar system (e.g., up and down) can be controlled. The lidar scanner 106 may have a range of up to several kilometers. A camera system 108 having one or more cameras may also be employed by the system 102 to capture digital image data, for example, associated with the environment surrounding the craft during flight. In particular, as the aircraft approaches the landing zone, the radar, lidar and camera systems can be pointed at the landing zone for periods of time. Also, a global positioning system or GPS system 110 may be provided for locating coordinates of the craft within a given space, such as latitude and longitude data, for example.

In certain embodiments, an inertial navigation system 112 (INS) may also be used for aiding navigation. The INS 112 may use measurements provided by accelerometers and gyroscopes, for example, to track the position and orientation of a craft relative to a known starting point, orientation and velocity. As such, the INS 112 may include some combination of orthogonal rate gyroscopes, orthogonal accelerometers for measuring linear acceleration, and/or motion-sensing devices. The INS 112 may be provided with initial position and velocity data from another source, such as the GPS system 110 for example, and thereafter compute updated position and velocity data by integrating information received from its motion sensors. The GPS system 110 and the INS system 112 can be programmed to operate collaboratively as complementary systems. In certain embodiments, a combined GPS/INS systems can be programmed to use GPS satellite signals to correct or calibrate a solution from an INS. The benefits of using GPS with INS also include providing position and angle updates at an enhanced rate than using GPS alone. Particularly with regard to dynamic vehicles such as aircraft and rotorcraft, the INS system 112 can fill in data gaps between detected GPS positions, for example. Also, if the GPS system 110 loses its signal, the INS system 112 can continue to compute position and angle data during the lost GPS signal period.

The on-board computer system 103 and the various sensor systems 104-112 are loaded on-board or otherwise included on the aircraft. All of these multiple sensor systems collect data over time as the aircraft flies or otherwise travels or hovers over the terrain below, including toward or over the landing zone, and the data are time stamped so that the position and orientation of the aircraft at each time stamp can be estimated, and the time stamped pose estimates can be used to generate a 3D mapping of the landing zone terrain.

As shown in FIG. 1, the on-board computer system 103 may comprise a number of software modules, including a pose estimation module 114, a mapping module 116, an object detection module 118, a flight planning module 122, a sensor directional pointing module 124, an autonomous flight control system 126, and a landing zone (LZ) evaluation module 130. The on-board computer system 103 may comprise one or more, preferably multi-core, processors and one or more memory units. The memory units may comprise software or instructions that are executed by the processor(s), including the above-mentioned software modules. The memory units that store the software/instructions that are executed by the processor may comprise primary computer memory, such as RAM or ROM. The software may also be stored in secondary computer memory, such as hard disk drives and solid state drives.

In various embodiments, data from the lidar system 106, the camera system(s) 108, the GPS system 110, and/or the INS 112 can be communicated to the pose estimation module 114 of the on-board computer system 103. The pose estimation module 114 can be programmed to continuously update the estimate of the position and orientation ("pose") of the craft including its latitude, longitude, altitude, and direction over time (e.g., time-stamped pose estimates). Information from the pose estimation module 114, along with data from the radar system 104 and the lidar system 106, can be communicated to the mapping module 116 of the on-board computer system 103, to generate continuously updated geo-registered point clouds. The output from the camera system(s) 108 may also be feed to the mapping module 116 to aid in generating the point clouds. In certain embodiments, the mapping module 116 can be programmed to generate the point clouds by registering data it receives into a global space by determining where each data measurement it receives belongs in that 3D space. Data mapped by the mapping module 116 can then be communicated to the object detection module 118 of the on-board computer system 103 for determination of which mapped data represent an "object" of concern (e.g., wires, trees, buildings, bridges, etc.) and which mapped data do not comprise an object of concern. For example, the object detection module 118 may employ one or more different kinds of clustering algorithms for determining the presence of a curve shape (for example a catenary shape) which may be a power transmission line or a cable in the path of the craft. In various embodiments, the object detection module 118 can be programmed to determine and associate a location within the global space for each of the detected objects. Also, the object detection module 118 can filter out spurious data, such as caused by obscurants, such as dust, snow, etc. Also, the object detection module 118 could generate a dense 3D probabilistic representation of the environment for the vehicle, such as a 3D evidence grid in which every cell in the grid reports the likelihood that there is an object in that cell, regardless of whether the object is classified as a particular type of object or not. The flight planning modules may utilize such 3D representations in various embodiments. In certain embodiments, a user alert module (not shown) may be provided for providing an audible, visual, or other alert to the flight crew of the craft (if there is one) that an object of concern has been detected, for example.

The flight planning module 122 of the on-board computer system 103 may be programmed to receive data input from the object detection module 118 and/or the pose estimation module 114 to continuously calculate (e.g., update) a flight path for the craft to follow during its flight. In the context of a fully autonomous rotorcraft, for example, the flight planning module 122 may automatically determine, and continuously update, a flight path or trajectory to follow with little or no human interaction. In various embodiments, the sensor directional pointing module 124 of the on-board computer system 103 may be programmed to receive flight plan data from the flight planning module 122 and/or mapped data from the mapping module 116. The sensor directional pointing module 124 operates to direct one or more of the sensors (e.g., radar, lidar, and/or camera systems) in the direction where the craft is planning to travel in accordance with the flight plan. That is, the radar, lidar, and/or camera systems may each include mechanized systems for controlling in which directions the systems point in capturing data; for example, they can scan across the area in the impending flight path of the aircraft, including pointing toward the landing zone to do the terrain evaluation described herein before landing. It can be appreciated that the sensor directional pointing module 124 provides a feedback loop for the process of obtaining updated data regarding objects which may arise in the path of the craft as it travels through an environment along the previously determined flight path, or in the landing zone. In various embodiments, the autonomous flight control system 126 of the on-board computer system 103 receives data input from the flight planning module 122 and/or the pose estimation module 114. The flight control system 126 may be programmed to execute the movement and general operation of the craft along the calculated flight plan, among performing other tasks. That is, output from the flight control system 126 can be used to control the propulsion and steering systems of the aircraft. The propulsion system(s) 132 may include engines, motors, propellers, propulsive nozzles, and rockets, for example. The steering systems may include propeller blade pitch rotators, rudders, elevators, ailerons, etc.

Figure 2:
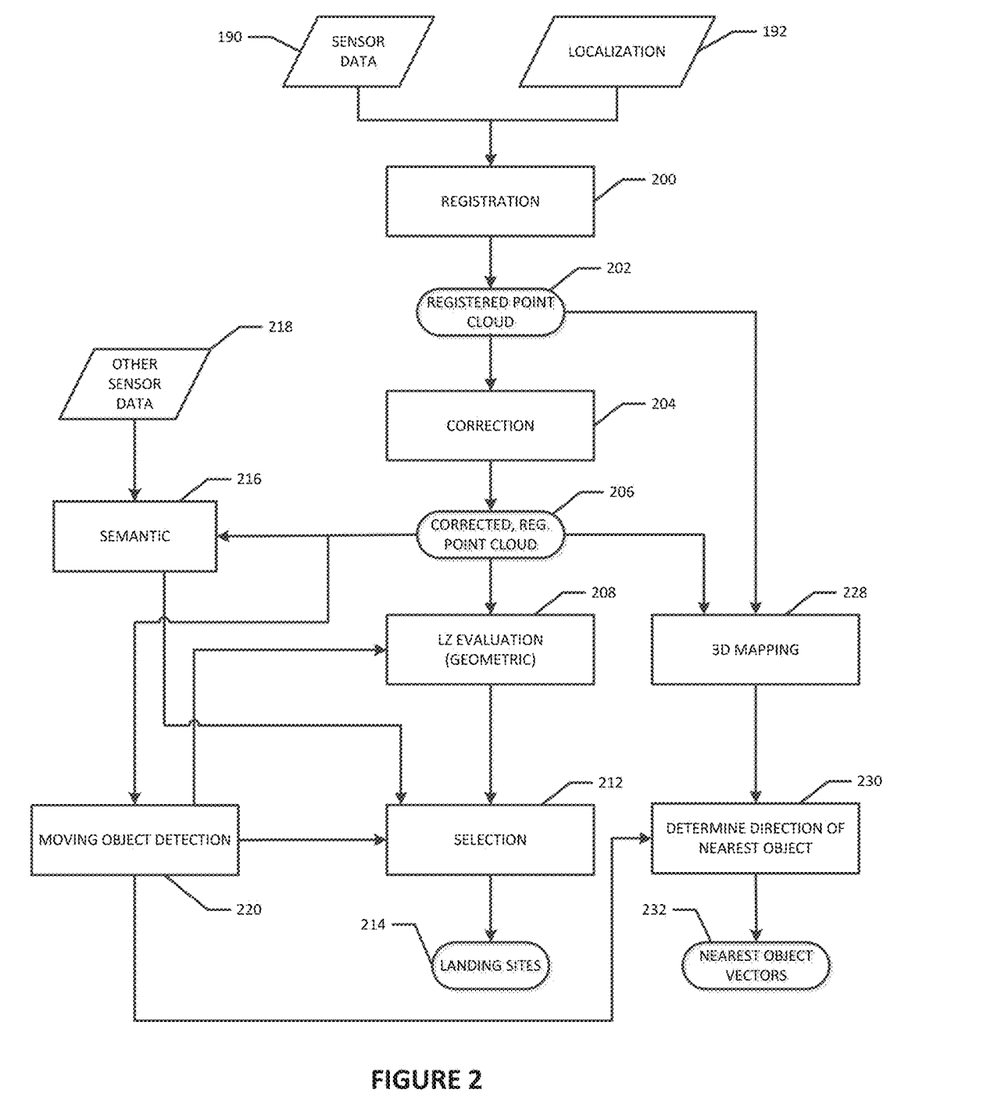
FIG. 2 is a flow chart of a process flow executed by an on-board computer system of the flight system according to various embodiments of the present invention.

FIG. 1 also shows the landing zone (LZ) evaluation module 130, in conjunction with the object detection module 118, which can evaluate a landing zone for the aircraft as described herein based on the input data from the various sensor systems 104, 106, 109, 110, 112. FIG. 2 is a diagram of a process flow that can be executed by the LZ evaluation module 130 and the object detection module 118, collectively, of the on-board computer system 103 to identify potentially suitable landing sites in a landing zone for the rotorcraft according to various embodiments of the present invention. The process flow shown in FIG. 2 can be performed continuously to refine the identification of suitable landing sites as the aircraft approaches the landing zone. At step 200, the LZ evaluation module 130 generates a registered point cloud 202 in a global frame of the surrounding environment of the rotorcraft, which includes some or all of the landing zone since, presumably, the aircraft is approaching the landing zone. The LZ evaluation module 130 can generate the registered point cloud 202 based on input sensor data 190 from the sensor systems, such as the radar system 104, the lidar system 106, and the camera system 108. The LZ evaluation module 130 can also use the position, orientation and/or velocity data 192 from the GPS module 110 and/or the INS 112 to generate the registered point cloud 202.

Because the sensor data 190 inherently has varying degrees of error in it, next, at step 204, the LZ evaluation module 130 can correct the registered point cloud to generate a corrected, registered point cloud 206. In one embodiment, the LZ evaluation module 130 uses multiple sweeps (or images) from the lidar system 106 (and/or other sensor systems) to correct the registered point cloud. In one embodiment, the LZ evaluation module 130 aligns the points in the point clouds from multiple lidar images and then merges the point clouds to generate a more complete image/point cloud of the aircraft's surrounding environment. The LZ evaluation module 130 can use an iterative closest point (ICP) algorithm to minimize the distance between the points in the point clouds. In one embodiment, the LZ evaluation module 130 uses every point and then optimizes for shifting to minimize the distance between points. In another implementation, the LZ evaluation module 130 uses only a subset of selected points in the point clouds for the ICP algorithm. In such an implementation, the LZ evaluation module 130 chooses points that are matched correctly to be used in the ICP algorithm.

Figure 3:
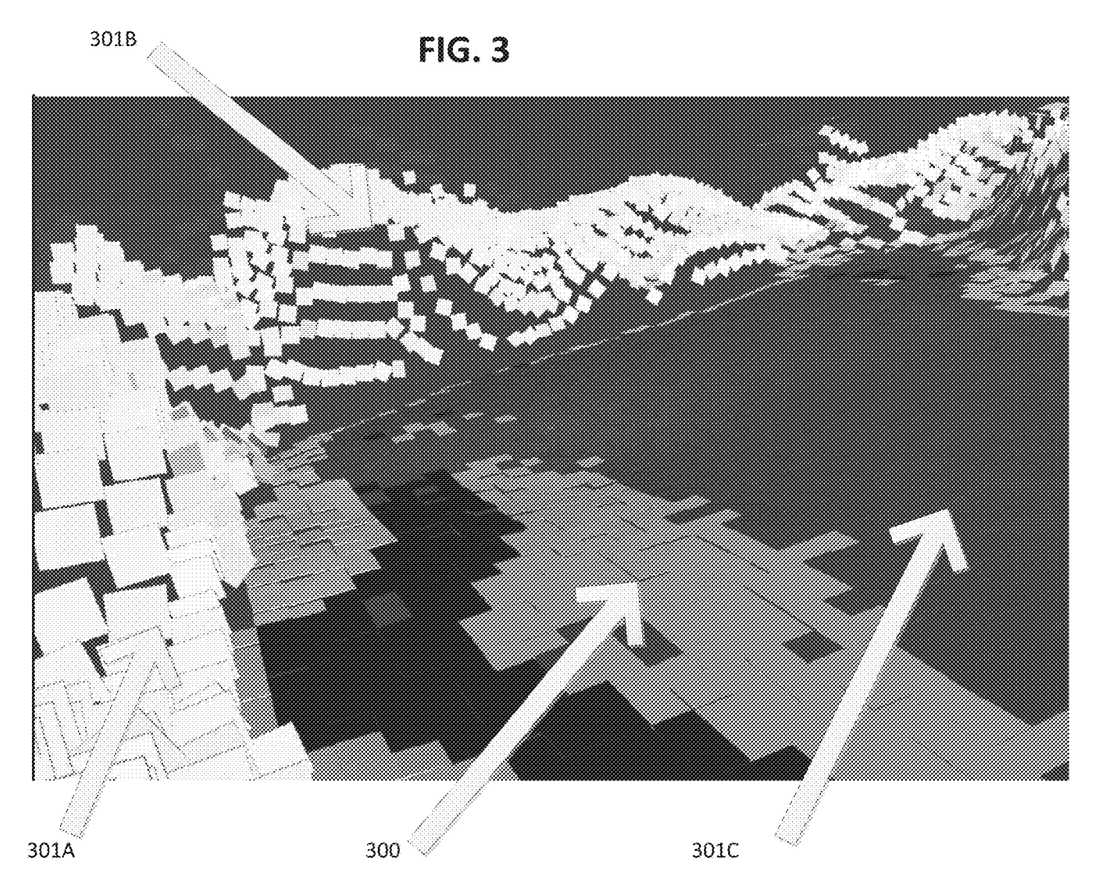
FIG. 3 is a diagram illustrating a process for geometrically evaluating a landing zone according to various embodiments of the present invention.

As the aircraft approaches the landing zone, it typically slows down, allowing more dense point clouds to be generated from the lidar sweeps. As shown in FIG. 2, the corrected, registered, dense point cloud 206 is used in multiple ways by the LZ evaluation module 130 to identify appropriate landing sites. For example, at step 208, the LZ evaluation module 130 can use the point cloud 206 to geometrically evaluate possible landing sites in the landing zones. In various embodiments, the LZ evaluation module 130 can perform this step by fitting numerous, densely-packed, two-dimensional planes in the three-dimensional map of the landing zone terrain, as illustrated in the example of FIG. 3. As shown in this example, the planes can have any 3D orientation. The LZ evaluation module 130 can ignore from consideration isolated or stray points in the point cloud since they likely do not represent a nearby object in the dense point cloud. Then, the LZ evaluation module 130 can identify "flat" (level, not sloped) planes without much deviation or "roughness." In the example of FIG. 3, the generally flat planes are in the area marked "300," whereas non-flat or sloped planes, potentially representing trees and hills, are in the areas marked "301A-C." Areas 301A-B likely represent trees, whereas area 301C likely represents a hill since it is sloped. Of those flat, level planes 301, the LZ evaluation module 130 can identify and eliminate planes that have or are near objects that would inhibit landing of the rotorcraft. The LZ evaluation module 130 can identify such objects based on points that stick out above the ground plane and/or do not have flat, level planes. The LZ evaluation module 130 can also look for groups of neighboring planes that are relatively flat and level to identify larger landing sites for consideration, considering the craft's size and possible landing orientations. The LZ evaluation module 130 can identify small objects (e.g., hand-held objects, debris, etc.) that should not be under the sleds of the rotorcraft as well as large objects (e.g., persons, trees) that should not be near the craft's rotors. Moving objects near the planes that would inhibit landing can also be identified once the moving objects are detected at step 220, which is described below. The output of step 208 can be confidence scores for the various identified planes, where a high confidence score indicates that there is high confidence that the plane is flat, level and free of objects that would inhibit landing, and a low confidence score indicating that there is a low confidence that the plane is suitable for landing. The LZ evaluation module's confidence scores about the existence and location of objects in the landing zone can increase as the rotorcraft comes closer to the landing zone, since the lidar and radar systems 106, 104 are sweeping lesser area.

Each cell in the terrain grid can be evaluated for slope, residual of fitting, and variance of height by applying mathematical operations, such as an algorithm to determine a linear least squares fit along the z dimension to each cell. The least squares fitting algorithm can generate terrain information that is a collection of connected components, each component being a cell that has had good fitting, e.g., flat slope, low residual, and low height variance.

By way of further explanation, as the aircraft approaches the landing zone, the aircraft is closer to the ground and can reduce its speed, both contributing to improved data quality from the sensors, particularly the lidar scanner 106. Large features, such as large trees, can be detected very early (further away from the landing zone) because the quality of data needed to detect them is lower. Smaller objects can be detected later in the flight, when the aircraft gets closer to the landing zone and the data quality is better. This is usually acceptable since action to avoid the smaller objects is less than needed to avoid large objects. Accordingly, in various embodiments, the object detection module 118 can change the size of objects and terrain features it is trying to detect as the aircraft gets closer to the landing zone to leverage the higher quality data. For example, the object detection module 118 can only use data of sufficient quality for a given object or terrain feature size; it does not need to use data measured from far away (beyond a threshold distance) to detect small objects. This prevents false detections due to poor data quality.

In various embodiments, the object detection system can keep track of how much data of each quality level has been collected to determine the confidence it has that objects or terrain features of each size level would have been detected. For example, at distances relatively far from the landing zone, the object detection module 18 might be confident there is no large object (or confident there is a large object) at a particular location in the landing zone, but uncertain as to whether there is a small object at that particular location. As the aircraft approaches the landing zone and the data quality concomitantly improves, the certainty about small objects can increase. "Size" in the above context could also be semantic terrain features that are easier or harder to detect (e.g., "big" objects can include semantic terrain features that are easier to detect and "small" objects can include semantic terrain features that are not easy to detect). For example, standing water might not require high quality data so it can be detected further from the landing zone (e.g., it has a "big" size), but mud might require high quality data to detect so that it is only detected when the aircraft gets closer to the landing zone (e.g., it has a "small" size), irrespective of the actual sizes of the standing water and mud area.

At step 212, the on-board computer system 103 can select possible landing sites 214 for the rotorcraft that can be supplied to the rotorcraft's flight planning system 122. The selection step 212 preferably also uses inputs from a semantic analysis step 216 and a moving object detection step 218 to better determine the suitable landing sites 214. Thus, before the selection step 212 is described, the semantic analysis and moving object detection steps 216, 220 are described first.

The landing zone evaluation step 208 primarily uses the lidar sensory data from the lidar system 106. Such lidar data, however, only yields the shapes of objects. Shapes alone are ordinarily insufficient for determining a suitable landing site for a rotorcraft because different types of objects present varied threats to the craft. By reasoning about the semantic identity of detected objects, the LZ evaluation module 130 can help the craft avoid these dangers and safely operate. To perform such semantic analysis, the vehicle can be equipped with a suite of sensors which measure 3D space along with other object properties such as visible color, hyper-spectral color, electrical capacitance, or other physical properties. For example, RGB and/or infrared (IR) camera systems 108 (see FIG. 1), whose input data are represented generally by block 218 in FIG. 2, could be used in addition to the lidar data (which is primarily used to generate the registered point cloud 206). Additional, lack of data can be used in the semantic analysis; the lack of lidar hits where you might otherwise expect them can help identify water. The measured properties of each point in space are georegistered into a map. The algorithm continuously evaluates each point on the map using its features and the features of its neighborhood to find objects of interests. These objects are tracked as the aircraft moves. The system then continuously considers the object's properties, dynamics, and its own motion to evaluate potential threats, which can be input to the selection step 212. In the case of an aircraft approaching for landing, this can mean evaluating the type of surface such that the system can reason about whether the surface can support the aircraft: solid ground is better than the roof of a dilapidated building; grass is better than returns off of water; etc. This will allow greater safety and reliability in landing aircraft. The semantic analysis step 216 can use machine learning classification to classify each point in the map as "landable" or "not landable" based on the measured properties of each point. The updated landable/not landable classification for each point can be used by the selection step 212 in selecting the suitable landing sites. In other implementations, in addition to or in lieu of the landable/not-landable classifications, the semantic analysis step 216 can provide a confidence score for each point indicative of the confidence that the point is landable.

The moving object detection step 220 can be performed by the object detection module 118. At this step, moving objects in the landing zone are detected, since they too can complicate the landing process. In one embodiment, to detect moving objects, the object detection module 118 first determines which points in the point cloud 206 belong to the ground (e.g., are on the ground floor) and which points do not. In one embodiment, the object detection module 118 assumes that points above the ground plane are not on the ground. The object detection module 118 can then cluster the points above the ground to identify objects. As the rotorcraft moves relative to the landing zone (e.g., approaches it for landing), the object detection module 118 can assess whether any identified objects moved related to a prior scan (e.g., lidar scan used for the point cloud 206). If an identified object keeps moving, the object detection module 118 concludes that the object is a moving object. It can also predict where the object will be in the near-term future based on its prior movements. The moving object detection step 220 can output to the selection step 212 confidence scores for each cell in the point cloud whether it has a moving object or will have the moving object in the near future, and the selection step 212 can use this information in determining suitable landing sites 214.

At the selection step 212, the LZ evaluation module 130 can employ rules to identify suitable landing sites 214 in the landing zone, which can be provided to the flight planning module 122. The rules can relate to, among other things: how close the rotorcraft can be to different sized objects (moving or stationary) when it lands; suitable (and unsuitable) orientations of the rotorcraft at landing given the objects in the landing area; the semantic analysis. The LZ evaluation module 130 can determine the potentially suitable landing sites 214 based on each of (i) the confidence scores from the landing zone geometric evaluation step 208, (ii) the semantic identification at step 216, and/or (iii) the detection of moving objects at step 220. The LZ evaluation module 130 preferably selects planes with high confidence scores from the landing zone geometric evaluation step 208 (indicative of high confidence that there are no obstructing objects in the plane). As the aircraft initially approaches the landing zone, the LZ evaluation module 130 can select several geographically diverse landing sites in the landing zone based on the confidence scores 210, etc. As the aircraft moves closer to the landing zone, the confidence scores 210 can change with the updated point clouds, particularly when small, potentially-obstructing objects (moving or stationary) are detected. To remain robust, the selection step 212 does not ordinarily select completely new geographically diverse, potential landing sites in the landing zone when a new object is detected, but instead selects another potential site (or sites) that is (are) near the now-bad site. For example, if a detected object in the potential landing site is small, the LZ evaluation module 130 may adjust the location of the site slightly to avoid the small, detected object. The LZ evaluation module 130 can also rule out (or reduce priority-wise) locations based on the semantic analysis at step 216. For example, it can rule out locations classified as "not landable." The LZ evaluation module 130 can also rule out (or reduce priority-wise) locations that recently had, or are predicted to have in the near future, a movable object, as determined by the moving object detection step 220.

Another potential variation on the landing site selection step 212 is that in selecting the potential landing sites, the on-board computer system 103 only considers potential sites in areas that the aircraft would be able to actually fly to (the feasible area). This prevents the landing evaluation system from choosing landing sites that are impossible or difficult for the aircraft to fly to at the current stage of approach. This can occur due to dynamic constraints of the aircraft, especially when a fast landing is an objective. For example, potential landing sites that are behind the aircraft's current position can be considered not feasible (not in the feasible area). That way, the on-board computer system will not expend computing resources evaluating "infeasible" landing sites.

To that end, another potential variation on the landing site selection step 212 is that the landing zone evaluation system 130 can focus on a region smaller ("a sub-region") than the entire landing zone during later stages of the approach in order to increase the detection capability with respect to the sub-region (or sub-regions). Focusing on the sub-region(s) allows very small objects to be detected, and subtle semantic classifications to be made, by dramatically increasing the amount of data available in the sub-region(s).

The sub-region(s) can be selected during the selection step 212. The target landing location where the aircraft is currently planned to land is included in the sub-region. In addition, some region, nearby or around the current target landing location, that currently has a high probability of also being suitable for landing can also be included to ensure alternate landing locations are also evaluated, such as if a small object is detected in the primary target, compelling consideration and evaluation of one or more alternative landing locations. The total size/area of the focal sub-region(s) can be chosen to ensure that the sensor data density (e.g., the lidar data) will be sufficient for the current stage of the approach. For example, the focal sub-region(s) can be larger earlier in the approach, but can be reduced later in the approach, as the aircraft gets closer to the landing zone, to increase the data density and increase the likelihood of detection of very small objects. The focal sub-region(s) would ideally not include areas that are already known to be unsafe for landing, so that sensor data is not "wasted" in areas that will not be used for landing. In addition, the region would ideally not include areas that are outside the feasible area, described above.

In addition to detecting objects on the ground that may complicate landing, the aircraft also preferably detects the direction of impediments to safe flying on an ongoing basis while flying, denoted by step 230 in FIG. 2, which step can be performed by the object detection module 118. Flight-impeding objects can be, for example, cell phone towers, tall buildings, other aircraft, mountains, etc. The output of step 230 can be continuously updated data on the location of the nearest flight-impeding object for each cell of a 3D map, indicated by block 232, which can be provided to the flight planning module 122 (see FIG. 1) for consideration in determining the aircraft's flight plan. In the example process flow illustrated in FIG. 2, the direction determination of the flight-impeding objects at step 230 relies on the generation of a 3D map at step 228. The 3D map may be generated based on the corrected, registered point cloud 206 and/or the uncorrected registered point cloud 202, both of which are continuously updated as the aircraft flies and acquires new lidar sweep data, etc. Based on these point clouds, the object detection module 118 can generate a 3D map that indicates the likelihood that there is a flight-obstructing object in each cell of the 3D map. The likelihood for a given cell of the 3D map can be determined, for example, based on a ratio of the number of times a lidar sweep detected an object in the cell ("hits") to the total number of lidar sweeps over the cell (in some implementations, newer data can be weighted greater in determining the likelihoods). The object detection module 118 does not need to determine the type or identity of the object at this step, just the likelihood that there is an object at a particular cell of the 3D map. The continuously updated 3D maps generated at step 228 can also be supplied to the flight planning module 122.

Figure 4A:
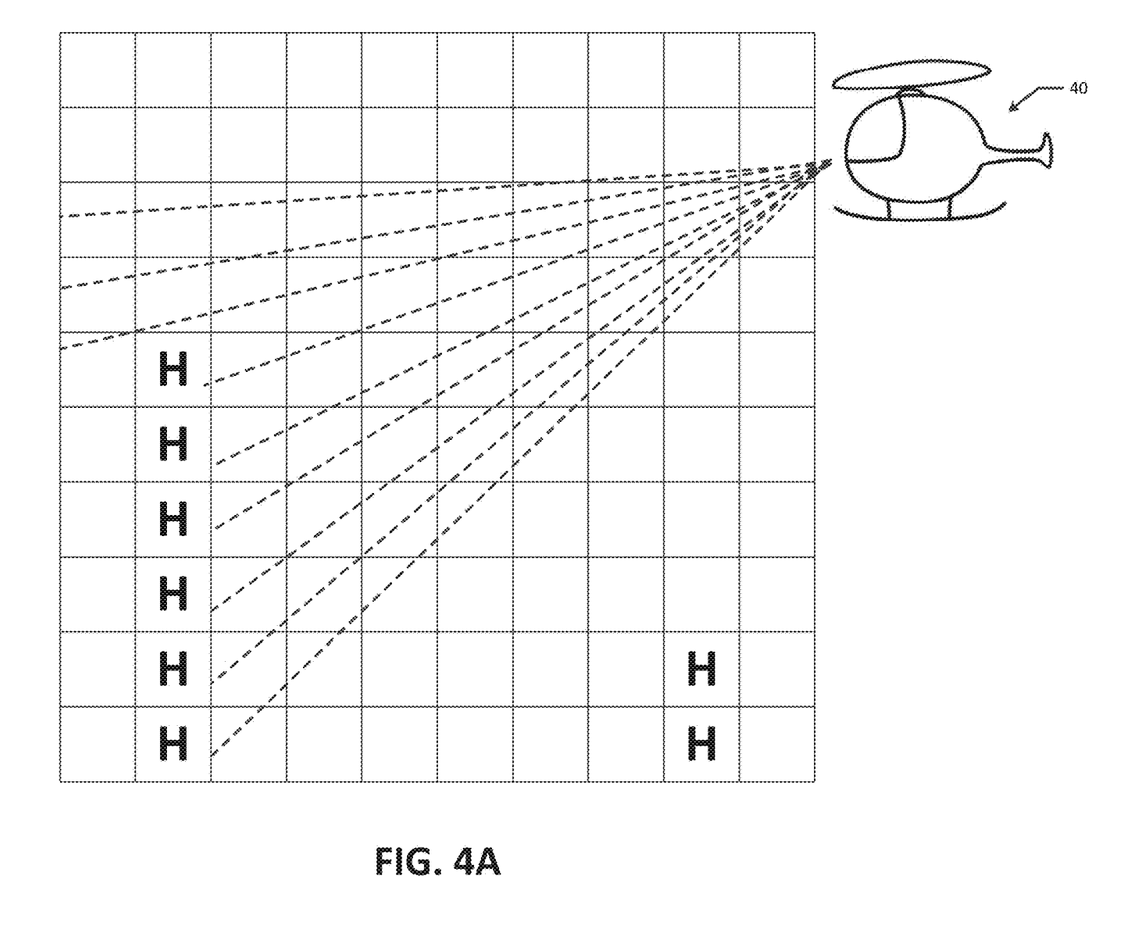
FIGS. 4A and 4B are diagrams that illustrate a process for determining the direction of the nearest detected object for each cell in a 3D map.
Figure 4B:
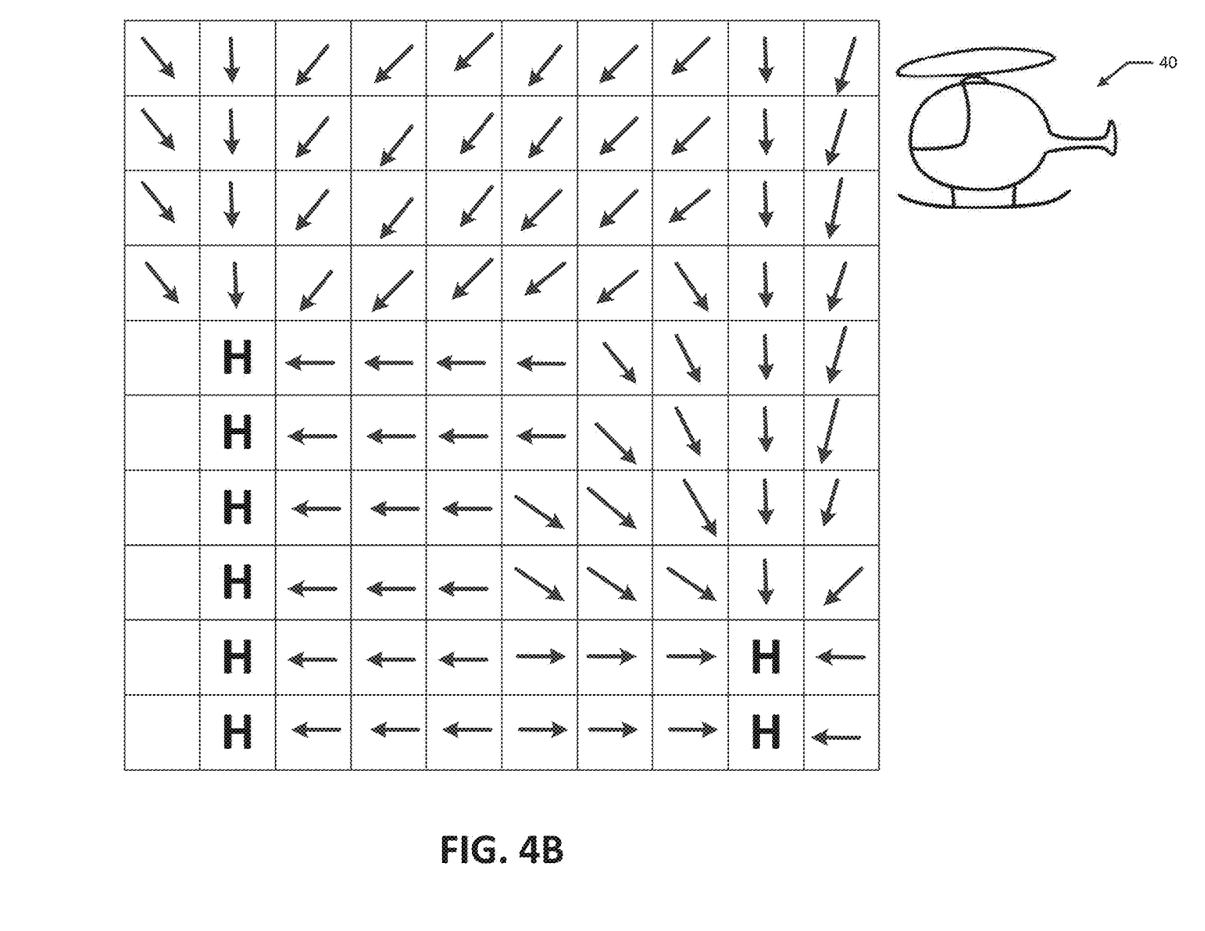

In one embodiment, the nearest object direction determination step 230 determines the direction of and distance to the nearest obstacle for each cell in the 3D map based on the 3D map generated at step 228. This concept is illustrated in FIGS. 4A and 4B. FIG. 4A shows a simplified 2D grid of the 3D map generated at step 228 from the lidar system 106 (and/or other systems) of the aircraft 40. For purposes of this explanation, assume the grid cells that have a high likelihood of having an object are indicated by "H". The nearest object direction determination step 230 determines the direction of and distance to the nearest object for each cell of the 3D map, with the directions being indicated by the arrows in FIG. 4B. The direction and distance can be determined based on the direction from the cell of interest to the closest cell with an object, and the distance can be determined based on the distance between those two cells. These direction/distance vectors for the cells are continuously updated as the rotorcraft flies and collects more, updated lidar sweeps. And the vectors can be provided to the flight planning module 122 (see FIG. 1), as mentioned above. The nearest object direction determinations can be updated incrementally. That is, all the vectors do not need to be recomputed when new information arrives. Instead, only the parts of the existing map that are newly incorrect are updated. This is important because it is vastly more efficient computationally and makes it possible to keep the map up to date in real-time. The maps, both the likelihood map and the direction map, can be efficiently scrolled while flying, e.g., the maps are moved but typically such that there is overlap with the old location, i.e. most data is retained. This is advantageous because the maps have a limited size and it is desirable to always cover the region around the vehicle.

The landing-zone evaluation system described herein could also be used on autonomous or piloted aircraft, such a rotorcraft. In cases where the landing-zone evaluation system is used with a piloted aircraft, the outputs of the landing-zone evaluation system (e.g., the potential landing sites 214 and/or the direction/length vectors for nearby objects 232) can be provided to a warning system of the aircraft, which may generates visual and/or audible warnings or other alerts for the pilot(s). For piloted aircraft, the landing zone evaluation system can provide warnings or other alerts to the flight crew, and/or provide its suitable landing sites to a guidance system of the aircraft that helps aid the pilot in landing the aircraft at the selected landing site.

In one general aspect, therefore, the present invention is directed to a landing zone evaluation system for evaluating a landing zone for an aircraft. In various embodiments, the landing system evaluation system 102 comprise a plurality of sensor systems and an on-board computer system 103. The plurality of sensor systems comprise, among other things, a lidar scanning system 106 that continuously scans the landing zone as the aircraft travels toward the landing zone; a camera system 108 comprising one or more cameras pointed at the landing zone for continuously capturing image data of the landing zone as the aircraft travels toward the landing zone; and an inertial navigation system (INS) 112. The on-board computer system 103 is loaded on board the aircraft such that it is in communication with the plurality of sensor systems. The on-board computer system 103 is programmed to, among other things, continuously generate updated registered point clouds 202, 206 as the aircraft travels toward the landing zone based on data from the plurality of data systems, including data from the lidar scanning system 106 and data from the INS; continuously geometrically analyze points in the registered point clouds 202, 206 as the aircraft travels toward the landing zone corresponding to the landing zone's terrain to identify potential landing sites in the landing zone; continuously semantically analyze points in the registered point cloud 202, 206 corresponding to the landing zone's terrain as the aircraft travels toward the landing zone, based on data from the plurality of sensor systems, including the image data from the camera system 108; and identify one or more suitable landing sites in the landing zone based on the continuously updated geometric and semantic analysis.

In various implementations, the on-board computer system assigns points in the registered point clouds with geometric-analysis confidence scores that indicate the points' suitability for landing the aircraft based on the geometric analysis and/or assigns points in the registered point clouds with semantic-analysis confidence scores that indicate the points' suitability for landing the aircraft based on the semantic analysis. As such, the on-board computer system can use the geometric-analysis confidence scores and the semantic-analysis confidence scores to identify the one or more suitable landing sites in the landing zone, as described above.

In addition, the on-board computer can be further programmed to identify objects (moving or stationary) in the landing zone based on the continuously updated registered point clouds, with the identified objects also be used by the on-board computer system in identifying the one or more suitable landing sites. In addition, the aircraft can comprise an autonomous aircraft, in which case the on-board computer system can comprise a flight planning module that continuously determines an updated flight path for the autonomous aircraft. In various embodiments, the flight planning module determines the updated flight path for the autonomous vehicle based on the one or more suitable landing sites identified by the on-board computer system. In addition, the on-board computer system may be further programmed to continuously generate updated 3D maps of the vicinity of the aircraft as the aircraft travels toward the landing zone based on the registered point clouds. The 3D maps may comprise a plurality of cells extending in three dimensions (x, y and z), and each cell in the map indicates a likelihood of an obstacle for the aircraft being in a location corresponding to the cell's location in the 3D map. As such, the on-board computer system can be programmed to determine, for cells in the 3D maps, a direction of and distance to a closet obstacle, and the flight planning module can use the direction of and distance to the closest obstacle for the cells in the 3D maps in determining the flight path for the aircraft.

In another general aspect, the present invention is directed to a method or evaluating a landing zone for an aircraft as the aircraft travels toward the landing zone. The method comprises the step of sensing data with a plurality of sensor systems from the aircraft as the aircraft travels toward the landing zone. The plurality of sensor systems can comprise, as mentioned above, the lidar scanning system 106, the camera system 108, and the INS. The method can further comprise the step of continuously generating, with an on-board computer system, updated registered point clouds as the aircraft travels toward the landing zone, where the registered point clouds are generated based on data from the plurality of data systems, including data from the lidar scanning system and data from the INS. The method can also comprise the step of continuously geometrically analyzing, by the on-board computer system, points in the registered point clouds corresponding to the landing zone's terrain as the aircraft travels toward the landing zone to identify potential landing sites in the landing zone. The method can also comprise the step of continuously semantically analyzing, by the on-board computer system, points in the registered point cloud corresponding to the landing zone's terrain as the aircraft travels toward the landing zone, based on data from the plurality of sensor systems, including the image data from the camera system. In addition, the method can comprise the step of identifying, by the on-board computer system, one or more suitable landing sites in the landing zone based on the continuously updated geometric and semantic analysis.

In another general aspect, the present invention is directed to an aircraft that comprises propulsion means for propelling the aircraft and the landing zone evaluation system described above. To that end, the on-board computer system 103 can continuously determine an updated flight path for the autonomous aircraft based in part on the one or more suitable landing sites and determine appropriate control signals for the propulsion means based on the updated flight path.

The processes associated with the present embodiments may be executed by programmable equipment, such as computers, such as the on-board computer system 103. The on-board computer system 103 may comprise one or more computer devices, such as laptops, PCs, servers, etc. Where multiple computer devices are employed, they may be networked through wireless or wireless links, such as an Ethernet network. Each of the one or more computer devices of the computer system 103 comprises one or more processors and one or more memory units. The memory units may comprise software or instructions that are executed by the processor(s). The memory units that store the software/instructions that are executed by the processor may comprise primary computer memory, such as RAM. It may also be stored in secondary computer memory, such as diskettes, compact discs of both read-only and read/write varieties, optical disk drives, hard disk drives, solid state drives, or any other suitable form of secondary storage.

The modules described herein (e.g., the pose estimation module 114, the mapping module 116, the object detection module 118, the flight planning module 122, the sensor directional point module 124, the autonomous flight control system module 126, and the landing zone evaluation module 130) may be implemented as software code stored in a memory unit(s) of the on-board computer system 103 that is executed by a processor(s) of the on-board computer system 103. In various embodiments, the modules 114, 116, 118, 120, 122, 126 and 130 are part of a single on-board computer device (e.g., a single laptop, PC or server), and the digital elevation map module 704 in implemented with its own dedicated on-board server. In other embodiments, the modules 114, 116, 118, 120, 122, 126, 130 could be implemented with one or more on-board computer systems. The modules and other computer functions described herein may be implemented in computer software using any suitable computer programming language such as .NET, SQL, MySQL, HTML, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. Those of ordinary skill in the art will recognize that a sufficient understanding of the present invention can be gained by the present disclosure, and therefore, a more detailed description of such elements is not provided herein. Each of the individual embodiments described and/or illustrated herein has discrete components and features which may be readily separated from or combined with the features of any of the other several aspects without departing from the scope of the present disclosure. Any recited method can be carried out in the order of events recited or in any other order which is logically possible.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes," or "contains" one or more elements possesses those one or more elements, but is not limited to possessing only those one or more elements. Likewise, an element of a system, device, or apparatus that "comprises," "has," "includes," or "contains" one or more elements possesses those one or more elements, but is not limited to possessing only those one or more elements. Also, "based on" in the claims is opened-ended; something that is "based on" one consideration or item could be based on other considerations or items as well.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A landing zone evaluation system for evaluating a landing zone for an aircraft, the landing system evaluation system comprising:
    a plurality of sensor systems that comprise: a lidar scanning system that continuously scans the landing zone as the aircraft travels toward the landing zone; a camera system comprising one or more cameras pointed at the landing zone for continuously capturing image data of the landing zone as the aircraft travels toward the landing zone; and an inertial navigation system (INS); and
    an on-board computer system that is on-board the aircraft, wherein the on-board computer system is in communication with the plurality of sensor systems, and wherein the on-board computer system is programmed to:
    continuously generate updated registered point clouds as the aircraft travels toward the landing zone based on data from the plurality of data systems, including data from the lidar scanning system and data from the INS; continuously geometrically analyze points in the registered point clouds corresponding to the landing zone's terrain as the aircraft travels toward the landing zone to identify potential landing sites in the landing zone, wherein the geometric analysis comprises: determining points in the registered point clouds that correspond to a ground surface of the landing zone; identifying whether or not there are one or more above-ground objects in the landing zone based on clusters of points above the ground surface in the registered point clouds; and identifying low-deviation, generally level planes in the landing zone, continuously semantically analyze points in the registered point cloud corresponding to the landing zone's terrain as the aircraft travels toward the landing zone, based on data from the plurality of sensor systems, including the image data from the camera system; and identify one or more suitable landing sites in the landing zone based on the continuously updated geometric and semantic analysis, wherein the identification of the one or more suitable landing sites considers whether there is an above-ground object in the landing zone, the size of the aircraft, possible landing orientations for the aircraft, and a size of a low-deviation, generally level area in the landing zone.

2. The landing zone evaluation system of claim 1, wherein: the aircraft comprises an autonomous aircraft; the on-board computer system comprises a flight planning module that continuously determines an updated flight path for the autonomous aircraft based on the one or more suitable landing sites identified by the on-board computer system.

3. The landing zone evaluation system of claim 1, wherein the on-board computer system assigns points in the registered point clouds with geometric-analysis confidence scores that indicate the points' suitability for landing the aircraft based on the geometric analysis.

4. The landing zone evaluation system of claim 3, wherein the on-board computer system assigns points in the registered point clouds with semantic-analysis confidence scores that indicate the points' suitability for landing the aircraft based on the semantic analysis.

5. The landing zone evaluation system of claim 4, wherein the on-board computer system uses the geometric-analysis confidence scores and the semantic-analysis confidence scores to identify the one or more suitable landing sites in the landing zone.

6. The landing zone evaluation system of claim 1, wherein: the aircraft comprises an autonomous aircraft; the on-board computer system comprises a flight planning module that continuously determines an updated flight path for the autonomous aircraft; and the flight planning module determines the updated flight path for the autonomous vehicle based on the one or more suitable landing sites identified by the on-board computer system.

7. The landing zone evaluation system of claim 6, wherein the on-board computer system is further programmed to: continuously generate updated 3D maps of the vicinity of the aircraft as the aircraft travels toward the landing zone based on the registered point clouds, wherein the 3D maps comprise a plurality of cells extending in three dimensions, and each cell indicates a likelihood of an obstacle for the aircraft being in a location corresponding to the cell's location in the 3D map; determine, for cells in the 3D maps, a direction of and distance to a closet obstacle; and the flight planning module uses the direction of and distance to the closest obstacle for the cells in the 3D maps in determining the flight path for the aircraft.

8. The landing zone evaluation system of claim 1, wherein the on-board computer system is further programmed to: continuously generate updated 3D maps of the vicinity of the aircraft as the aircraft travels toward the landing zone based on the registered point clouds, wherein the 3D maps comprise a plurality of cells extending in three dimensions, and each cell indicates a likelihood of an obstacle for the aircraft being in a location corresponding to the cell's location in the 3D map; and determine, for cells in the 3D maps, a direction of and distance to a closet obstacle.

9. A method for evaluating a landing zone for an aircraft as the aircraft travels toward the landing zone, the method comprising: sensing data with a plurality of sensor systems from the aircraft as the aircraft travels toward the landing zone, wherein the plurality of sensor systems comprises: a lidar scanning system that continuously scans the landing zone as the aircraft travels toward the landing zone; a camera system comprising one or more cameras pointed at the landing zone for continuously capturing image data of the landing zone as the aircraft travels toward the landing zone; and an inertial navigation system (INS); and continuously generating, with an on-board computer system that is on-board the aircraft and that is in communication with the plurality of sensor systems, updated registered point clouds as the aircraft travels toward the landing zone, wherein the registered point clouds are generated based on data from the plurality of data systems, including data from the lidar scanning system and data from the INS; continuously geometrically analyzing, by the on-board computer system, points in the registered point clouds corresponding to the landing zone's terrain as the aircraft travels toward the landing zone to identify potential landing sites in the landing zone; wherein the geometric analysis comprises: determining points in the registered point clouds that correspond to a ground surface of the landing zone; identifying whether or not there are one or more above-ground objects in the landing zone based on clusters of points above the ground surface in the registered point clouds, and identifying low-deviation, generally level planes in the landing zone; continuously semantically analyzing, by the on-board computer system, points in the registered point cloud corresponding to the landing zone's terrain as the aircraft travels toward the landing zone, based on data from the plurality of sensor systems, including the image data from the camera system; and identifying, by the on-board computer system, one or more suitable landing sites in the landing zone based on the continuously updated geometric and semantic analysis, wherein the identification of the one or more suitable landing sites considers whether there is an above-ground object in the landing zone, the size of the aircraft, possible landing orientations for the aircraft, and a size of a low-deviation, generally level area in the landing zone.

10. The method of claim 9, wherein: the aircraft comprises an autonomous aircraft with a flight planning module; and the method further comprises determining, by the flight planning module, updated flight paths for the autonomous aircraft as the autonomous aircraft travels toward the landing zone based on the one or more suitable landing sites identified by the on-board computer system.

11. The method of claim 9, wherein geometrically analyzing the points in the registered point clouds comprises assigning geometric-analysis confidence scores to the points that indicate the points' suitability for landing the aircraft based on the geometric analysis.

12. The method of claim 11, wherein semantically analyzing the points in the registered point clouds comprises assigning semantic-analysis confidence scores to the point that indicate the points' suitability for landing the aircraft based on the semantic analysis.

13. The method of claim 12, wherein the on-board computer system uses the geometric-analysis confidence scores and the semantic-analysis confidence scores to identify the one or more suitable landing sites in the landing zone.

14. The method of claim 13, wherein: the method further comprises identifying, by the on-board computer system, objects in the landing zone based on the continuously updated registered point clouds; and the step of identifying the one or more suitable landing sites further uses the identification of objects in the landing zone to identify the one or more suitable landing sites.

15. The method of claim 14, wherein: the aircraft comprises an autonomous aircraft that comprises a flight planning module; and the method further comprises continuously determining, by the flight planning module, an updated flight path for the autonomous aircraft based in part on the one or more suitable landing sites identified by the on-board computer system.

16. The method of claim 15, further comprising, by the on-board computer system: continuously generating updated 3D maps of the vicinity of the aircraft as it travels toward the landing zone based on the registered point clouds, wherein the 3D maps comprise a plurality of cells extending in three dimensions, and each cell indicates a likelihood of an obstacle for the aircraft being in a location corresponding to the cell's location in the 3D map; determining, for cells in the 3D maps, a direction of and distance to a closet obstacle, wherein the flight planning module uses the direction of and distance to the closest obstacle for the cells in the 3D maps in determining the flight path for the aircraft.

17. An aircraft comprising: propulsion means for propelling the aircraft; a plurality of sensor systems that comprise:
a lidar scanning system that continuously scans a landing zone for the aircraft as the aircraft travels toward the landing zone; a camera system comprising one or more cameras pointed at the landing zone for the aircraft for continuously capturing image data of the landing zone as the aircraft travels toward the landing zone; and an inertial navigation system (INS); and an on-board computer system that is on-board the aircraft, wherein the on-board computer system is in communication with the plurality of sensor systems, and wherein the on-board computer system is programmed to:
continuously generate updated registered point clouds as the aircraft travels toward the landing zone, wherein the registered point clouds are generated based on data from the plurality of data systems, including data from the lidar scanning system and data from the INS; continuously geometrically analyze points in the registered point clouds as the aircraft travels toward the landing zone to identify potential landing sites in the landing zone, wherein the geometric analysis comprises:
determining points in the registered point clouds that correspond to a ground surface of the landing zone; identifying whether or not there are one or more above-ground objects in the landing zone based on clusters of points above the ground surface in the registered point clouds, and identifying low-deviation, generally level planes in the landing zone; continuously semantically analyze points in the registered point cloud as the aircraft travels toward the landing zone, based on data from the plurality of sensor systems, including the image data from the camera system; and identify one or more suitable landing sites in the landing zone based on the continuously updated geometric and semantic analysis, wherein the identification of the one or more suitable landing sites considers whether there is an above-ground object in the landing zone, the size of the aircraft, possible landing orientations for the aircraft, and a size of a low-deviation, generally level area in the landing zone.

18. The aircraft of claim 17, wherein: the aircraft comprises an autonomous aircraft; and on-board computer system is further programmed to: continuously determine an updated flight path for the autonomous aircraft based in part on the one or more suitable landing sites; and determine control signals for the propulsion means based on the updated flight path.

19. The landing zone evaluation system of claim 1, wherein: identifying whether or not there is one or more objects in the landing zone further comprises determining whether there is a moving object in the landing zone by comparing registered point clouds for the landing zone from multiple time instances; and the step of identification of the one or more suitable landing sites further considers whether there is a moving object in the landing zone.

* * * * *